(12) United States Patent
Simmons

(10) Patent No.: US 6,298,933 B1
(45) Date of Patent: Oct. 9, 2001

(54) EQUALIZER BAR STOP ASSEMBLY FOR LIMITING MOVEMENT OF THE EQUALIZER BAR RELATIVE TO THE MAIN FRAME OF A TRACK-TYPE WORK MACHINE

(75) Inventor: Gerald P. Simmons, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/416,513

(22) Filed: Oct. 8, 1999

(51) Int. Cl.$^7$ ............................................... B62D 55/00
(52) U.S. Cl. ........................................ 180/9.5; 180/9.46
(58) Field of Search .................... 180/9.1, 9.23, 180/9.46, 9.5; 280/104, 4.11, 124.11, 124.177

(56) References Cited

U.S. PATENT DOCUMENTS

| | | | |
|---|---|---|---|
| 3,759,541 | * 9/1973 | Peterson | 280/112 R |
| 3,872,941 | * 3/1975 | Copeland | 180/9.5 |
| 3,889,769 | * 6/1975 | Blomstrom et al. | 180/9.5 |
| 3,924,703 | * 12/1975 | Purcell | 180/9.54 |
| 4,018,295 | * 4/1977 | Hasselbacher | 180/9.5 |
| 4,186,812 | 2/1980 | Sutton | 180/9.5 |
| 4,232,754 | * 11/1980 | Corrigan et al. | 180/9.5 |
| 4,364,443 | 12/1982 | Sato et al. | 180/9.5 |
| 4,385,673 | 5/1983 | Olt, Jr. | 180/9.5 |
| 4,838,373 | * 6/1989 | Price et al. | 180/9.46 |

* cited by examiner

Primary Examiner—Kevin Hurley
Assistant Examiner—Christopher Buchanan
(74) Attorney, Agent, or Firm—Samuel Digirolamo; Calvin E. Glastetter

(57) ABSTRACT

A main frame to roller frame stop assembly for limiting movement of an equalizer bar relative to the main frame of a track-type tractor or other work machine wherein the stop assembly includes a first member mountable to one of the roller frames, and a second member mountable to the main frame of the work machine, the second member being positioned and located to engage the first member when the equalizer bar moves a predetermined distance relative to the main frame, the first member being positioned and located in the vicinity of the bearing joint coupling the equalizer bar to the roller frame and further including an elastomeric portion capable of dampening and absorbing at least a portion of the load exerted thereagainst when the first stop member engages the second stop member. In another aspect of the present invention, the bearing joint coupling the equalizer bar to a respective roller frame includes a cylindrical bearing as compared to a conventional spherical bearing, the cylindrical bearing preferably including an elastomeric portion to even further dampen and absorb at least a portion of the load exerted directly onto the bearing joint. Regardless of the specific type of bearings utilized in the bearing joint, the present stop assembly can be utilized with any type of bearing.

11 Claims, 5 Drawing Sheets

EQUALIZER BAR STOP ASSEMBLY FOR LIMITING MOVEMENT OF THE EQUALIZER BAR RELATIVE TO THE MAIN FRAME OF A TRACK-TYPE WORK MACHINE

TECHNICAL FIELD

This invention relates generally to suspension systems for track-type tractors and other work machines utilizing an equalizer bar which allows for the oscillation of each side track relative to the main frame and, more particularly, to an equalizer bar employing stop assemblies which transfer the load away from the bearing joints associated with the equalizer bar.

BACKGROUND ART

Currently, suspension systems for track-type tractors and other work machines use an equalizer bar design that allows each side track of the tractor to oscillate and pivot relative to the main frame in order to negotiate uneven or irregular terrain. The known equalizer bar designs typically include a spherical bearing joint at each opposite end of the equalizer bar for coupling to the side roller frames of the tractor, the equalizer bar attaching the main frame of the track-type machine to the respective track-type roller frames.

When the left side portion of the equalizer bar contacts the main frame stop, the pivotal motion of the equalizer bar is prohibited and most of the machine load is thereafter directly supported by the left spherical bearing. This can provide undue load and impact on the left bearing. The same is true with respect to the right spherical bearing when the right side portion of the equalizer bar contacts the main frame of the machine.

Accordingly, the present invention is directed to overcoming one or more of the problems as set forth above.

DISCLOSURE OF THE INVENTION

In one aspect of this invention, a work machine having a main frame, at least one laterally spaced roller frame, and an equalizer bar movably mounted to the main frame for attaching to the at least one roller frame, at least one stop assembly for limiting movement of the equalizer bar relative to the main frame is disclosed. The stop assembly includes a first member attached to the at least one roller frame, and a second member associated with the main frame of the work machine, the second member being positioned and located to engage the first member when the equalizer bar moves a predetermined distance relative to the main frame of the work machine, the first and second members engaging each other prior to the equalizer bar engaging the main frame of the work machine.

In another aspect of the present invention, a method for assembling at least one stop assembly for limiting movement of an equalizer bar relative to a main frame in a work machine, having at least one laterally spaced roller frame and an equalizer bar movably mounted to the main frame for attaching to the at least one roller frame is disclosed. The method includes the steps of attaching a first member to the at least one roller frame, positioning and locating a second member, associated with the main frame of the work machine, to engage the first member when the equalizer bar moves a predetermined distance relative to the main frame of the work machine, and engaging the first and second members with each other prior to the equalizer bar engaging the main frame of the work machine.

BRIEF DESCRIPTION OF THE DRAWINGS

For a better understanding of the present invention, reference may be made to the accompanying drawings in which.

BEST MODE FOR CARRYING OUT THE INVENTION

Figure 1:
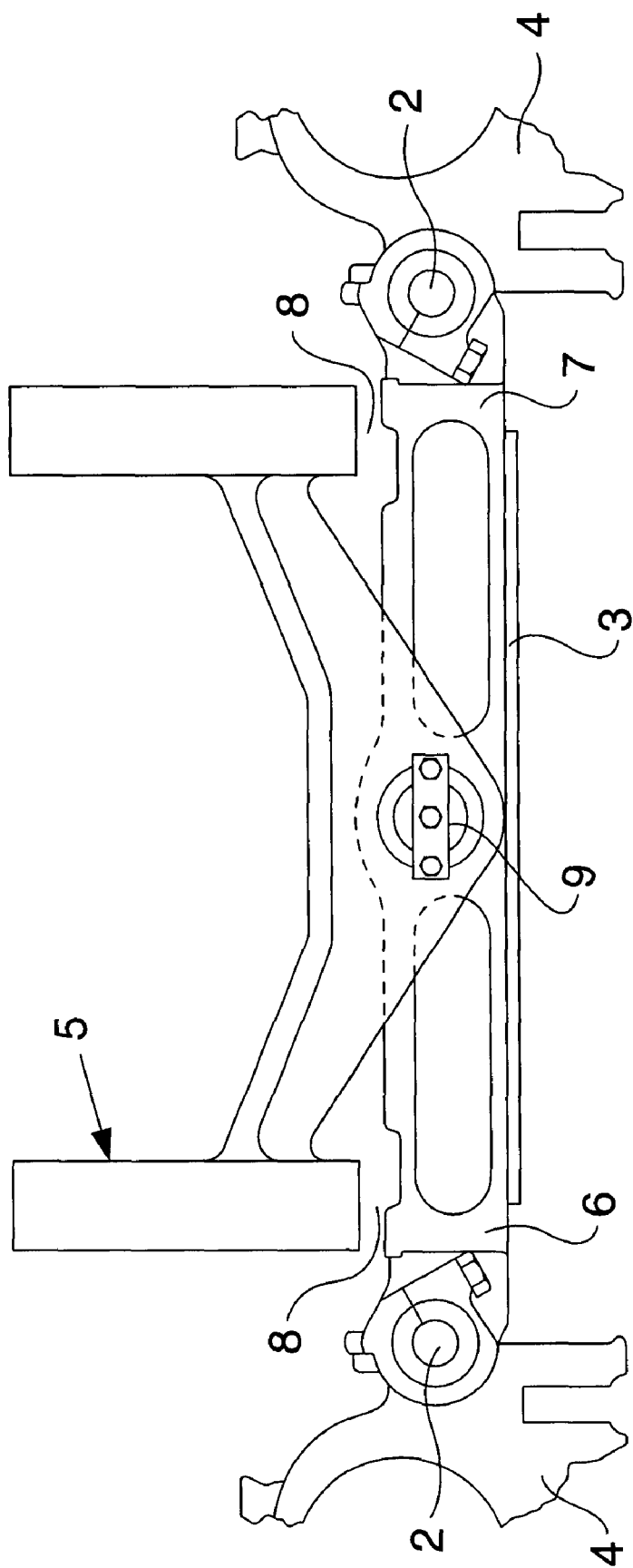
FIG. 1 is a fragmentary front elevational view showing a typical prior art equalizer bar mounted to the main frame of a track-type work machine and coupled to the respective roller frames at each opposite end thereof through the use of spherical bearing joints.

Referring now to the drawings and first to FIG. 1, which illustrates a typical equalizer bar design wherein a spherical bearing 2 located at each opposite end of the equalizer bar 3 is utilized to attach the respective roller frames 4 of the machine side tracks to a main frame 5 of a work machine. A work machine could include a track-type tractor, but is not limited thereto. The equalizer bar 3 is pivotally mounted to the main frame 5 at pivot connection point 9 which allows the left and right end portions 6 and 7 of the equalizer bar 3 to pivot up and down depending upon the contour of the terrain over which the work machine is moving. The ability to pivot up and down depending upon the terrain is important to the performance of these types of work machines as these machines function and operate in many situations where the terrain is routinely irregular, uneven and rough.

For example, work machines that are routinely used at construction sites where the terrain is uneven due to digging, mounds of dirt, debris and various trenches and other excavations typically associated with the construction process. The ability of the equalizer bar to pivot allows each of the machine's side tracks to oscillate independently of each other relative to the main frame of the work machine in order to negotiate irregular terrain. The left and right end portions 6 and 7 of the equalizer bar 3 are therefore free to pivot until either end portion comes into contact with the main frame. This equalizer bar 3 is currently designed to stop against the machine's main frame and this main frame to equalizer bar contact limits oscillation of the side tracks.

Consider the scenario of a track-type tractor being used at a construction site. At some point it is likely that one of the side tracks of the tractor will encounter uneven terrain. For instance, if the left side track encounters a mound of dirt while the right side track remains on stable, level ground, the left end portion 6 of the equalizer bar 3 in FIG. 1 will pivot upwards causing the right equalizer bar end portion 7 to remain substantially level or pivot downward. If the terrain is extremely uneven, as the left side of the equalizer bar 3 pivots upward it will eventually come into contact with the main frame 5 of the tractor. Currently, this stop action involves metal to metal contact between the main frame 5 and the equalizer bar 3 in the area 8 illustrated in FIG. 1. When the left side portion of the equalizer bar 3 contacts the main frame stop in the area 8, the pivotal motion of the equalizer bar 3 is prohibited and most of the machine load is thereafter directly supported by the left spherical bearing 2. This can provide undue load and impact on the left bearing 2. The same is true with respect to the right spherical bearing when the right side portion 7 of the equalizer bar 3 contacts the main frame of the machine.

It is the therefore desirable to relocate the stop mechanism for limiting the oscillation of the side tracks so as to transfer the machine load around the spherical bearings and redirect such load to the side track roller frame of the machine. It is also desirable to redesign the equalizer bar bearing joints so as to dampen the initial shock around the bearing and to better allow for any misalignment of the stop surfaces when the stop mechanism is engaged.

Figure 2:
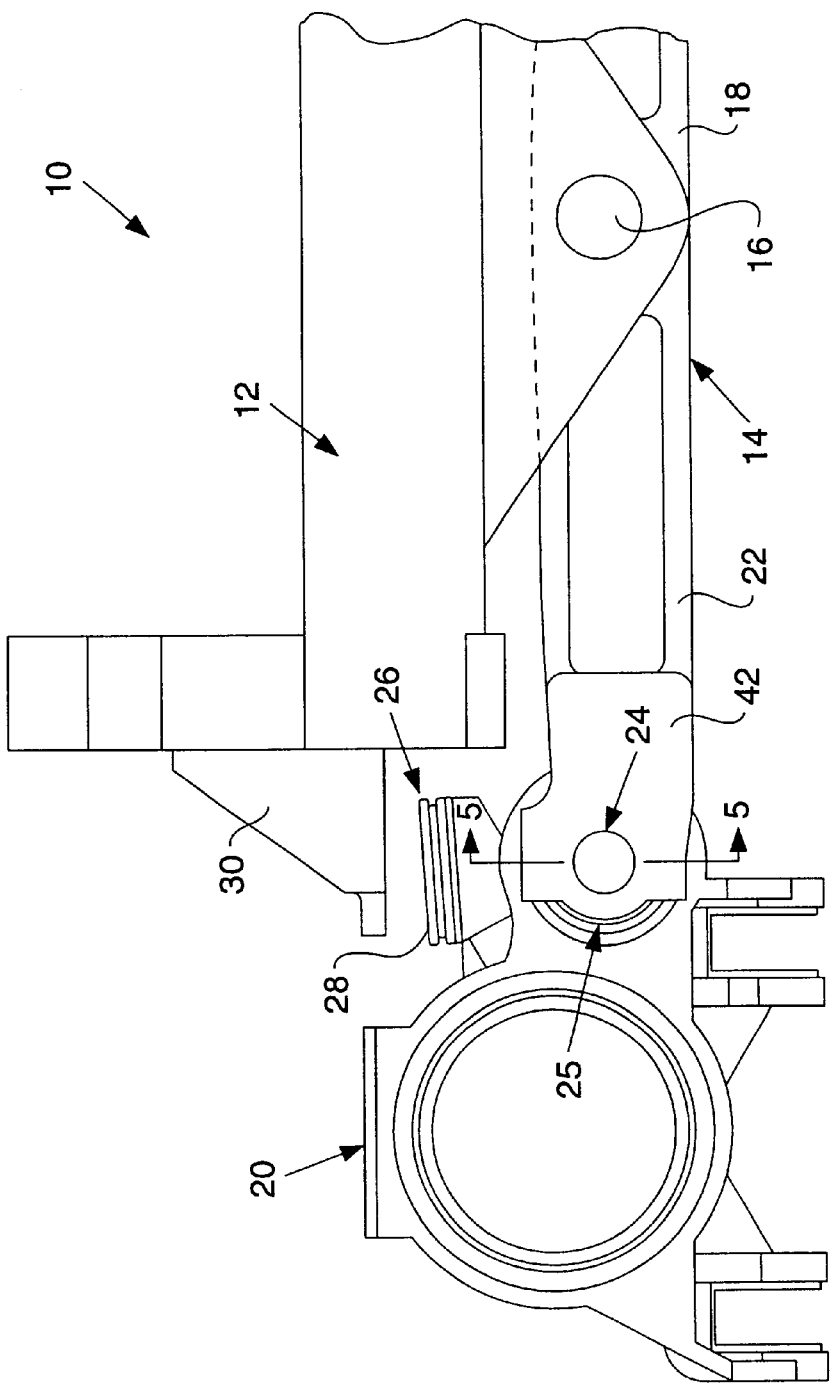
FIG. 2 is a fragmentary front elevational view of an equalizer bar stop assembly constructed in accordance with the teachings of the present invention, the present stop assembly being positioned and located relative to the roller frame of a track-type work machine and relative to a cylindrical bearing constructed in accordance with the teachings of the present invention.

In the exemplary embodiment of the present invention as disclosed in FIGS. 2–5, a partial work machine structure generally designated 10 is shown to include a main frame 12, an equalizer bar 14 and a roller frame 20. Although FIG. 2 only illustrates the equalizer bar coupled to the left roller frame, it is recognized that the right side of the work machine structure will be a mirror image of that shown in FIG. 2. Referring to FIG. 2, the equalizer bar 14 is pivotally connected to the main frame 12 by pivot means 16 at a mid-portion 18 of the equalizer bar, and roller frame 20 is attached or coupled to the left end portion 22 of the equalizer bar 14 by bearing joint 24. Bearing joint 24 is depicted in FIG. 2 as including a cylindrical bearing 25, although spherical bearings can also be used. The present stop assembly 26 is positioned and located in the vicinity directly above bearing joint 24 and includes a bottom member 28 attached to the roller frame 20 and a top member 30 attached to the main frame 12. This stop assembly configuration provides a stop mechanism between the main frame 12 and the roller frame 20 and completely obviates direct contact between the main frame 12 and the equalizer bar 14. Limited pivotal movement of the equalizer bar 14 is permitted until the bottom stop member 28 comes into contact with the top stop member 30. The preferred embodiment includes a main frame to roller frame stop assembly 26 associated with each roller frame 20.

As best illustrated in FIG. 2, the top member 30 of the present stop assembly 26 is integrally formed with or otherwise attached to the main frame 12 so as to at least partially extend or project sidewardly over the bearing joint 24 which couples the equalizer bar 14 to the roller frame 20. It is recognized and anticipated that the top main frame stop member 30 can take on a wide variety of different shapes and configurations so long as the bottom surface of stop member 30 is positioned and located so as to make contact with and engage the top surface of bottom stop member 28 as will be hereinafter further explained. Typically, the top stop member 30 will be made of steel or some other suitable metal or other material capable of withstanding the machine loads applied to the roller frame 20 when the members 28 and 30 make contact with each other during normal operating conditions.

Figure 3:
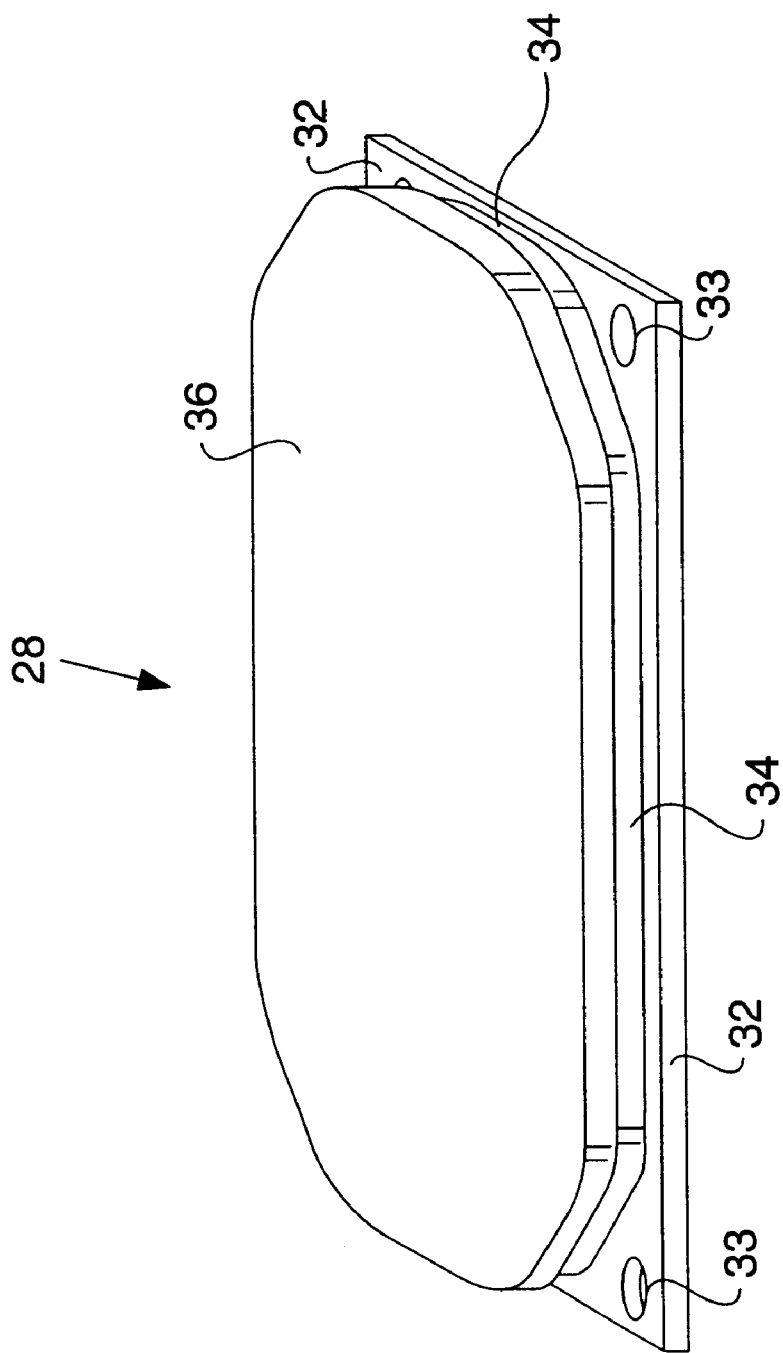
FIG. 3 is an enlarged perspective view of the bottom member of the present stop assembly constructed in accordance with the teachings of the present invention.

As best illustrated in FIG. 3, the bottom stop member 28 includes a base plate member 32 which is mounted to the roller frame 20 in the vicinity of the bearing joint 24, an elastomeric middle layer 34, and a top layer 36 which comes into direct contact with the top stop member 30 when the equalizer bar 14 is moved or pivoted towards the main frame 12 a predetermined distance. The base plate member 32 may include a plurality of openings 33, as illustrated in FIG. 3, for attaching the bottom member 28 to the respective roller frame 20, or base plate member 32 may include a wide variety of other means for accomplishing this task. For example, stop member 28 can be integrally formed with the roller frame 20, or such attachment can include attaching appropriate flanges or other members to the roller frame 20 in order to accommodate the position and location of the member 28 relative to both the bearing 25 and the main frame stop member 30. In this regard, the stop member 28 is preferably positioned and located directly over the bearing 25, as best illustrated in FIG. 2, such that the machine load generated when the stop members 28 and 30 are engaged will not be directly supported by and applied to the bearing 25 but, instead, such load will be substantially directed to other portions of the roller frame 20. Since the present stop assembly 26 prevents any portion of the main frame 12 from coming directly into contact with any portion of the equalizer bar 14, no machine load is transferred through the equalizer bar to the bearing 25.

It is also important to note that the elastomeric middle layer 34 is sandwiched between the base plate member 32 and the top layer portion 36, the elastomeric middle layer 34 being capable of absorbing at least a portion of the machine load exerted thereagainst when the stop member 28 engages the stop member 30. The elastomeric material can include any suitable resilient material capable of absorbing and withstanding the particular loads involved with any particular work machine application. In this regard, the base plate member 32 and the top layer portion 36 are preferably made of steel or some other suitable material likewise capable of withstanding the loads encountered during a particular machine application. It is also recognized and anticipated that more than one elastomeric layer may be incorporated into the bottom stop member 28 including sandwiching a plurality of elastomeric layers between a plurality of metallic layers without departing from the spirit and scope of the present invention. The elastomeric layer 34 functions to dampen the impact and load exerted when the bottom stop member 28 engages the member 30.

It should also be noted that the top layer portion 36 of the bottom stop member 28 is slightly angularly oriented relative to the bottom surface of stop member 30 when the member 28 is in a substantially level, horizontal position as illustrated in FIG. 2.

The angle of orientation is selected and predetermined such that as the equalizer bar and roller frame 20 are moved upward toward member 30 about pivot means 16 due to the work machine traversing uneven terrain, the top layer portion 36 of member 28 will be in a substantially horizontal position so as to evenly engage the bottom surface of member 30 when member 28 engages member 30. A substantially flush, even engagement of the top layer portion 36 of stop member 28 with the bottom surface of stop member 30 ensures that the load applied thereto is evenly distributed to the respective members and substantially prevents uneven wear and tear to the respective members 28 and 30 due to uneven contact between these members. In a similar fashion, if misalignment between the respective members 28 and 30 does occur, the elastomeric layer 34 will still compensate for such misalignment of the engaging surfaces and will allow for a more evenly distributed load to the respective members 28 and 30.

As previously stated, either spherical or cylindrical bearings may be used in association with the present stop assembly 26. If spherical bearings are utilized such as the spherical bearings 2 illustrated in FIG. 1, the equalizer bar will be of conventional design as likewise illustrated in FIG. 1 and the housing or other means for holding the spherical bearing in coupling arrangement with the equalizer bar is typically associated with the roller frame such as the roller frames 4 illustrated in FIG. 1. This construction will be different from the equalizer bar/roller frame construction illustrated in FIG. 2 wherein cylindrical bearings 25 are utilized to couple the equalizer bar 14 to the roller frame 20. The placement and location of the housing for holding spherical bearings is the only difference between using spherical bearings as compared to cylindrical bearings in association with the present stop assembly 26. Use of spherical, cylindrical or other type bearings will have no effect on the function and operation of the main frame to roller frame stop assembly 26 of the present invention.

Figure 4:
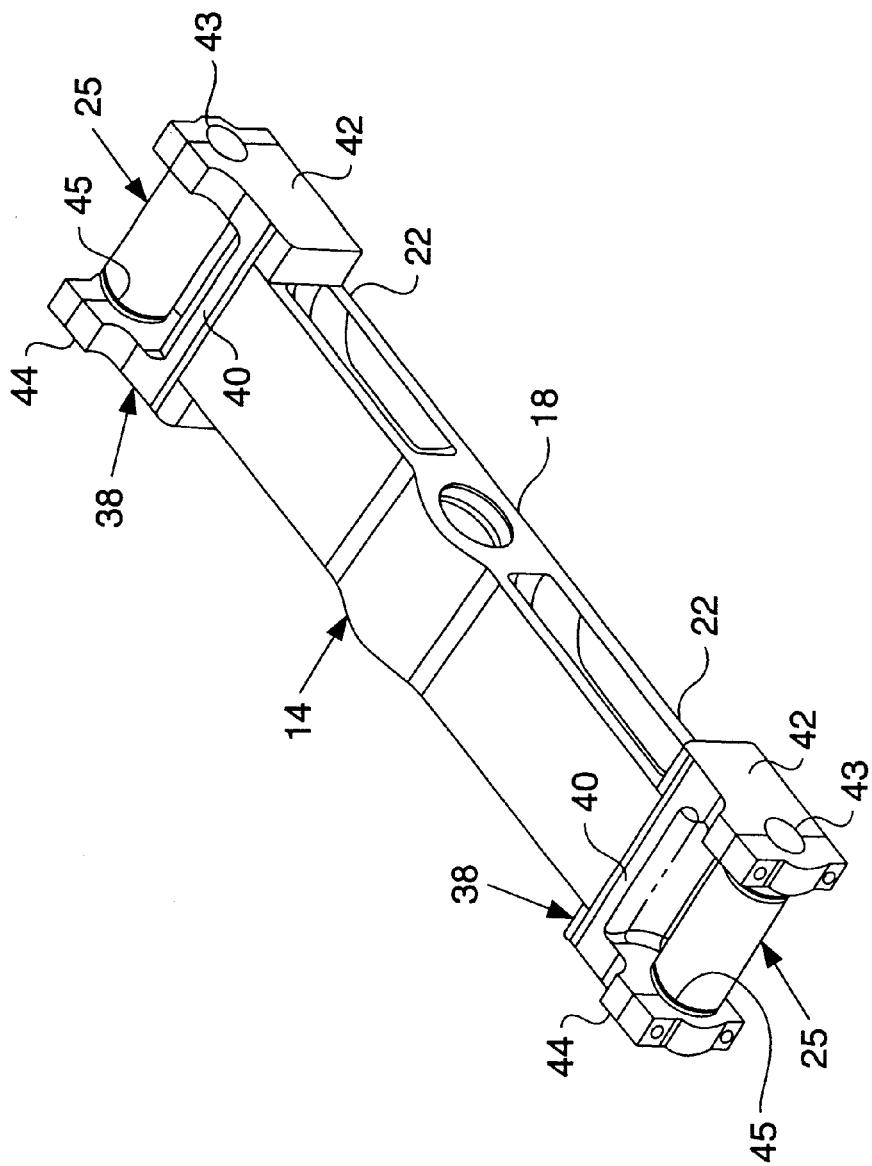
FIG. 4 is a perspective view of an equalizer bar constructed in accordance with the teachings of the present invention, the equalizer bar being capable of holding and coupling the present cylindrical bearings to the respective roller frames of a particular work machine.

FIG. 2 illustrates use of the present cylindrical bearing 25 in association with the present stop assembly 26. More particularly, when cylindrical bearings such as the bearing 25 are utilized for coupling the equalize bar 14 to the roller frame 20, the opposite end portions of the equalizer bar must be modified or adapted to receive and hold cylindrical bearings as compared to the conventional spherical bearings illustrated in FIG. 1. As a result, each opposite end portion of the equalizer bar 14 includes a substantially U-shaped member 38 having a middle or cross portion 40 and spaced parallel or substantially parallel arm portions 42 and 44 extending from the opposite ends of the cross portion 40 as best shown in FIG. 4. The cylindrical bearings 25 are attached to the equalizer bar by way of the respective arm portions 42 and 44. In this regard, each arm portion 42 and 44 will include a respective opening 43 and 45 (FIGS. 4 and 5) for receiving end portions of the bearing 25 as will be hereinafter further explained. The respective arm portions 42 and 44 may likewise be divided into a saddle portion and a cap portion as illustrated in FIG. 4 for facilitating attachment of the cylindrical bearing 25 to the respective end portions of the equalize bar 14.

Figure 5:
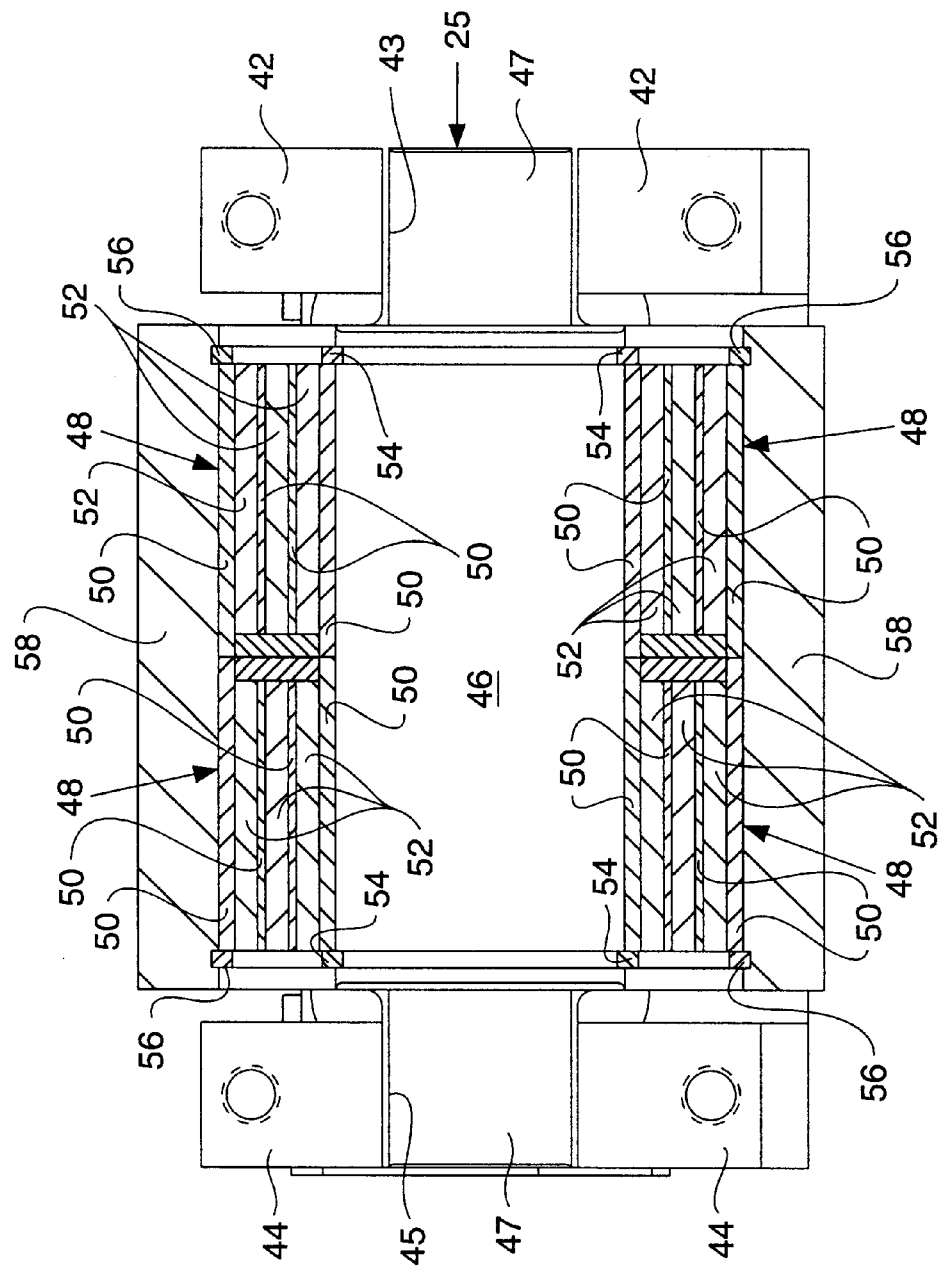
FIG. 5 is an enlarged cross-sectional view of the present cylindrical bearing taken substantially along line 5—5 of FIG. 2.

The cylindrical bearing 25 may also preferably include an elastomeric portion as best illustrated in FIG. 5. In this embodiment, the bearing 25 includes a steel pin member 46 which functions as the inner core of the cylindrical bearing, the pin member 46 including opposed end portions 47 which are adapted for engaging the respective openings 43 and 45 associated with the equalizer bar arm portions 42 and 44. As illustrated in FIG. 5, the cylindrical bearing 25 also includes one or more outer members or subassemblies 48 which wrap around at least a portion of the circumference of the pin member 46 as illustrated in FIG. 5. Each outer member or subassembly 48 is constructed of alternating layers of a metallic material 50 and an elastomeric material 52. The metallic material 50 is preferably steel or some other suitable material capable of withstanding the load and stresses applied to the bearing 25 during normal operating conditions, and the elastomeric material 52 can be any suitable resilient material capable of at least absorbing and/or dampening a portion of the load applied thereto similar to the elastomeric material 34 associated with the stop member 28. Although FIG. 5 illustrates the use of two subassemblies 48, it is recognized and anticipated that any number of outer members or subassemblies 48 can be utilized in association with a particular bearing 25 depending upon the particular application involved. Similarly, it is also recognized and anticipated that the present elastomeric cylindrical bearing 25 may be comprised of a single outer member or subassembly 48 extending around the circumference of the pin member 46, or the outer member 48 may be formed as part of the pin member 46. Still further, it is recognized and anticipated that any plurality of alternating layers of metallic material 50 and elastomeric material 52 may be utilized in any subassembly 48 depending upon the particular application involved.

In the particular embodiment illustrated in FIG. 5, the subassemblies 48 include an inner snap ring 54 which is engageable with the pin member 46 and an outer snap ring 56 which is engageable with the housing 58 associated with roller frame 20. The snap rings 54 and 56 function to hold the elastomeric subassemblies 48 in proper operative position and engagement with the pin member 46 and the roller frame 20. Other means for attaching the elastomeric subassemblies 48 to the inner core pin member 46 of the bearing 25 are likewise envisioned and anticipated by those skilled in the art.

Elastomeric cylindrical bearings require no seals or lubrication during use. As a result, this additional cost requirement is obviated.

INDUSTRIAL APPLICABILITY

As described herein, the present stop assembly 26 has particular utility in a wide variety of different applications wherein an equalizer bar is utilized to permit limited oscillation of the respective roller frames associated with a particular work machine in order to negotiate irregular or uneven terrain. The present main frame to roller frame stop assembly substantially decreases the machine loads placed upon the equalizer bar and the bearings coupling the equalizer bar to the respective roller frames and the present stop assembly functions to transfer such machine loads to other portions of the roller frame which are better able to handle such loads. In addition, the present stop assembly includes an elastomeric portion which is capable of absorbing at least a portion of the load placed on the stop assembly when the stop mechanism is engaged, and the elastomeric portion likewise accommodates any misalignment of the stop assembly surfaces at the time of engagement thereby substantially reducing wear and tear to the stop assembly as well to the bearings coupling the equalizer bar to the roller frame.

The present stop assembly is likewise useable with any type of bearing interface between the equalizer bar and the roller frame including conventional spherical bearings as well as cylinder bearings. In this regard, use of the present elastomeric cylindrical bearing likewise functions to further reduce any load applied directly to the bearing when the stop assembly is engaged. By transferring such machine loads around the bearings used to couple the equalizer bar to the roller frame, and by dampening the initial shock applied to such bearings during engagement of the stop assembly, a premature failure of such bearings is greatly reduced.

In addition, use of the present elastomeric cylindrical bearings in conjunction with the present elastomeric stop assembly further reduces wear and premature failure of the cylindrical bearings. Also, when elastomeric cylindrical bearings are used, seals and lubrication of the bearings are not required.

As is evident from the foregoing description, certain aspects of the present invention are not limited to the particular details of the examples illustrated herein, and it is therefore contemplated that other modifications and applications will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A work machine having a main frame, at least one laterally spaced roller frame, an equalizer bar movably mounted to the main frame for attaching to the at least one roller frame, and at least one stop assembly for limiting movement of the equalizer bar relative to the main frame, the stop assembly comprising:

a first member attached to the at least one roller frame; and a second member associated with the main frame of the work machine, the second member being positioned and located to engage the first member when the equalizer bar moves a predetermined distance relative to the main frame of the work machine, the first and second members engaging each other prior to the equalizer bar engaging the main frame of the work machine.

2. The work machine having a stop assembly, as set forth in claim 1, wherein the first member includes a layer of material capable of functioning as a minimal shock damper when the first member engages the second member.

3. The work machine having stop assembly, as set forth in claim 2, wherein the first member includes a layer of material capable of absorbing at least a portion of the load exerted thereagainst when the first member engages the second member.

4. The work machine having a stop assembly, as set forth in claim 1, wherein the first member includes three separate layers, the first layer including a base plate member mountable to the at least one roller frame, the second layer including an elastomeric material, and the third layer including a member having a surface engageable with the second member, the elastomeric material being sandwiched between the first and third layers.

5. The work machine having a stop assembly, as set forth in claim 4, wherein the base plate member, the member having a surface engageable with the second member, and the second member are made of a metallic material.

6. The work machine having a stop assembly, as set forth in claim 5, wherein the metallic material is steel.

7. The work machine having a stop assembly, as set forth in claim 4, wherein the member having a surface engageable with the second member is angularly oriented relative to the horizontal when the equalizer bar is in a substantially horizontal position.

8. The work machine having a stop assembly, as set forth in claim 7, wherein the member having a surface engageable with the second member is angularly oriented relative to the horizontal such that when the first member engages the second member, the surface engageable with the second member mates substantially flush with the second member.

9. The work machine having a stop assembly, as set forth in claim 1, including a bearing joint coupling the equalizer bar to the at least one laterally space roller frame, the stop assembly being positioned and located in the vicinity of the bearing joint.

10. A work machine having a main frame, a pair of laterally spaced roller frames and an equalizer bar pivotally mounted to the main frame, each opposite end of the equalizer bar being coupled to a respective roller frame, and a pair of stop assemblies for limiting movement of the equalizer bar relative to the main frame, at least one of the stop assemblies comprising:

a first member attached to one of the roller frames;

a second member attached to the main frame of the work machine, the second member being positioned and located to engage the first member when the equalizer bar is moved a predetermined distance relative to the main frame of the work machine; and the first member including a base plate member attachable to the roller frame, a top member having a surface engageable with the second member when the equalizer bar moves the predetermined distance, and an elastomeric material sandwiched between the base plate member and the top member for dampening at least a portion of the load exerted against the first member when the first member engages the second member.

11. A work machine having a main frame, a pair of laterally spaced roller frames, an equalizer bar moveably mounted to the main frame, and a bearing joint connecting each end of the equalizer bar to a respective one of the roller frames, at least one stop assembly for limiting movement of the equalizer bar relative to the main frame of the work machine, the stop assembly comprising:

a first member mountable to one of the roller frames;

a second member associated with the main frame of the work machine, the second member being positioned and located to engage the first member when the equalizer bar is moved relative to the main frame of the work machine;

the first member being positioned and located in the vicinity of a respective one of the bearing joints and including an elastomeric portion; and the respective bearing joint including a cylindrical bearing coupled to both the equalizer bar and one of the roller frames.

* * * * *